United States Patent
Hayakawa et al.

(10) Patent No.: US 7,463,390 B2
(45) Date of Patent: Dec. 9, 2008

(54) INFORMATION READING APPARATUS, METHOD AND SYSTEM FOR PROCESSING IMAGE, PROGRAM, AND RECORDING MEDIUM

(75) Inventors: Mizuki Hayakawa, Tokyo (JP); Atsuko Kashiwazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 980 days.

(21) Appl. No.: 11/012,821

(22) Filed: Dec. 14, 2004

(65) Prior Publication Data

US 2005/0141059 A1 Jun. 30, 2005

(30) Foreign Application Priority Data

Dec. 26, 2003 (JP) ............................. 2003-435448

(51) Int. Cl.
*H04N 1/387* (2006.01)
*H04N 1/38* (2006.01)
*H04N 1/04* (2006.01)

(52) U.S. Cl. .................. 358/452; 358/463; 358/474; 358/475

(58) Field of Classification Search ................ 358/452, 358/463, 474, 475, 406, 497; 250/208.1
See application file for complete search history.

(56) References Cited

U.S. PATENT DOCUMENTS

| 6,195,161 B1 * | 2/2001 | Edgar ...................... 356/237.1 |
| 6,660,987 B2 | 12/2003 | Koshimizu |
| 2002/0051248 A1 * | 5/2002 | Cook et al. ................. 358/488 |

FOREIGN PATENT DOCUMENTS

JP 05-14721 A 1/1993

* cited by examiner

*Primary Examiner*—Houshang Safaipour
(74) *Attorney, Agent, or Firm*—Canon USA IP Div

(57) ABSTRACT

An image reading apparatus detecting scratch and dirt information of a film document without the need for complex structures and complex control in the image reading apparatus. The apparatus can read a transmissive original document and/or a reflective original document. The apparatus includes a first light source that illuminates the transmissive original document, a second light source that illuminates one of the reflective original document and the transmissive original document, an image sensor that generates electronic image data, a detector unit that detects non-image information from the image data, and a correction unit that corrects the image data, based on the non-image information detected by the detector unit.

19 Claims, 14 Drawing Sheets

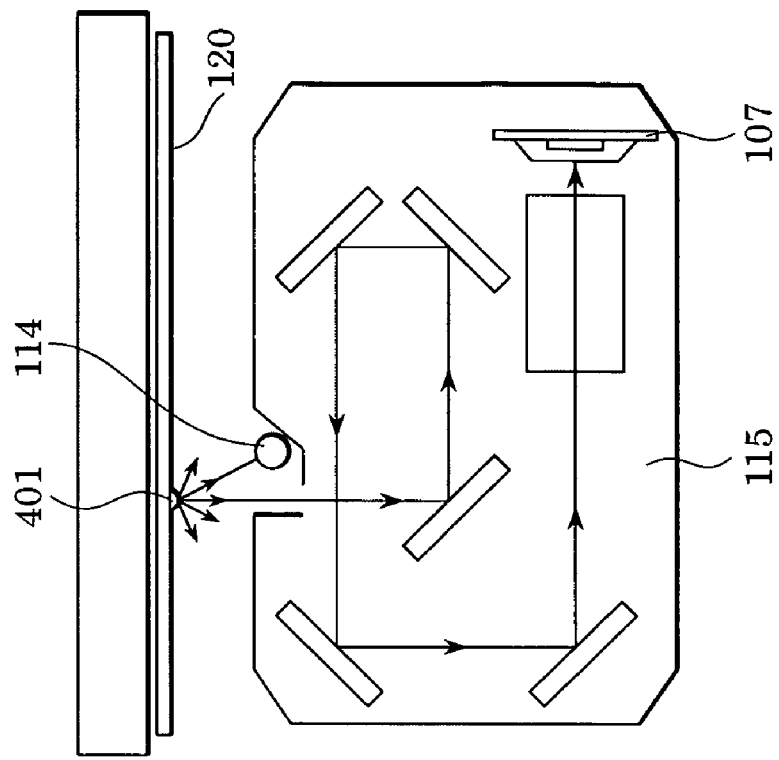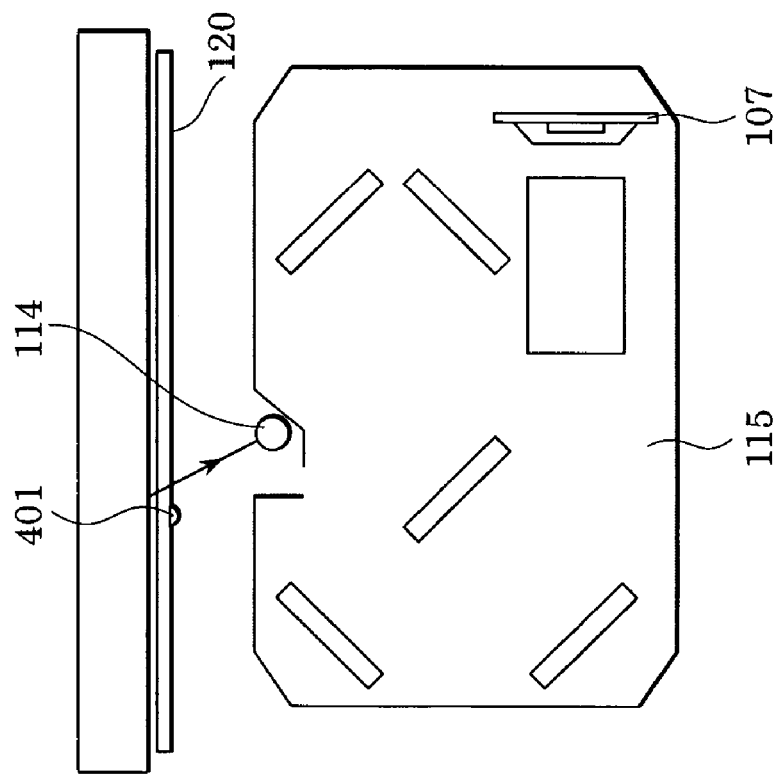

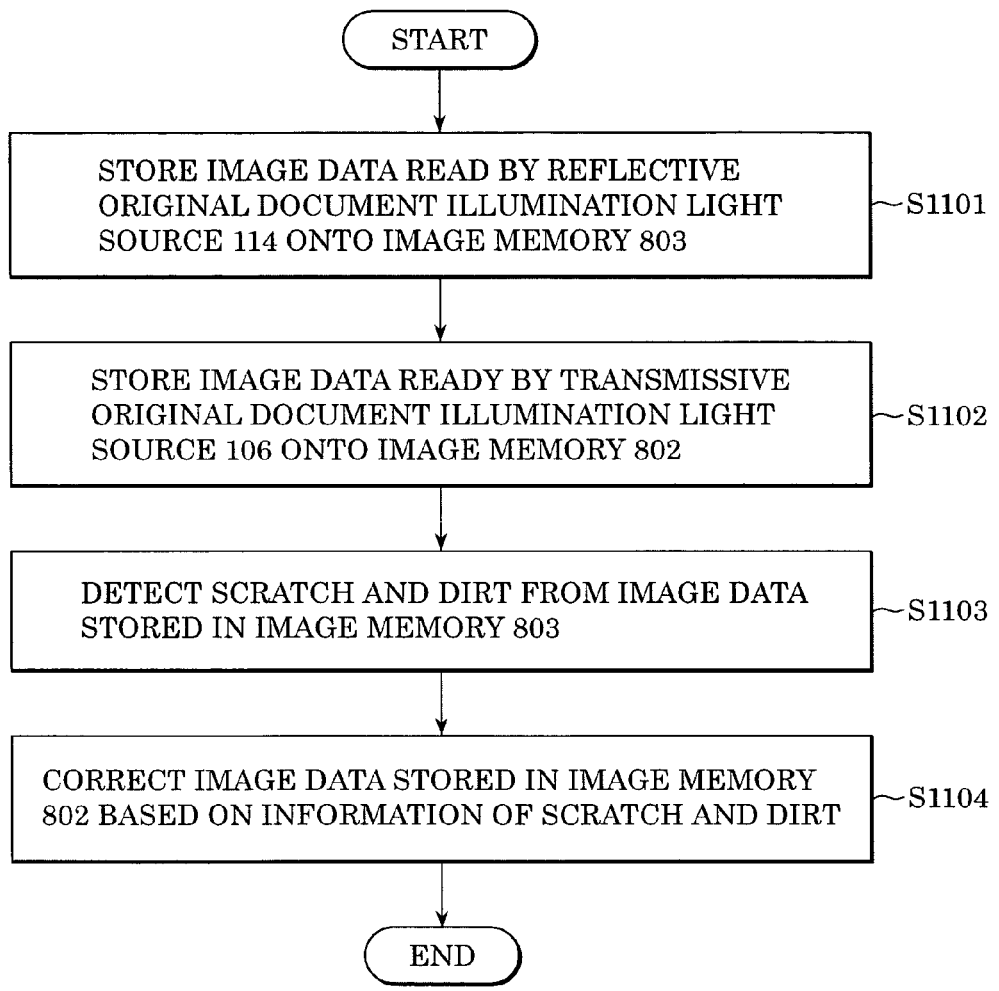

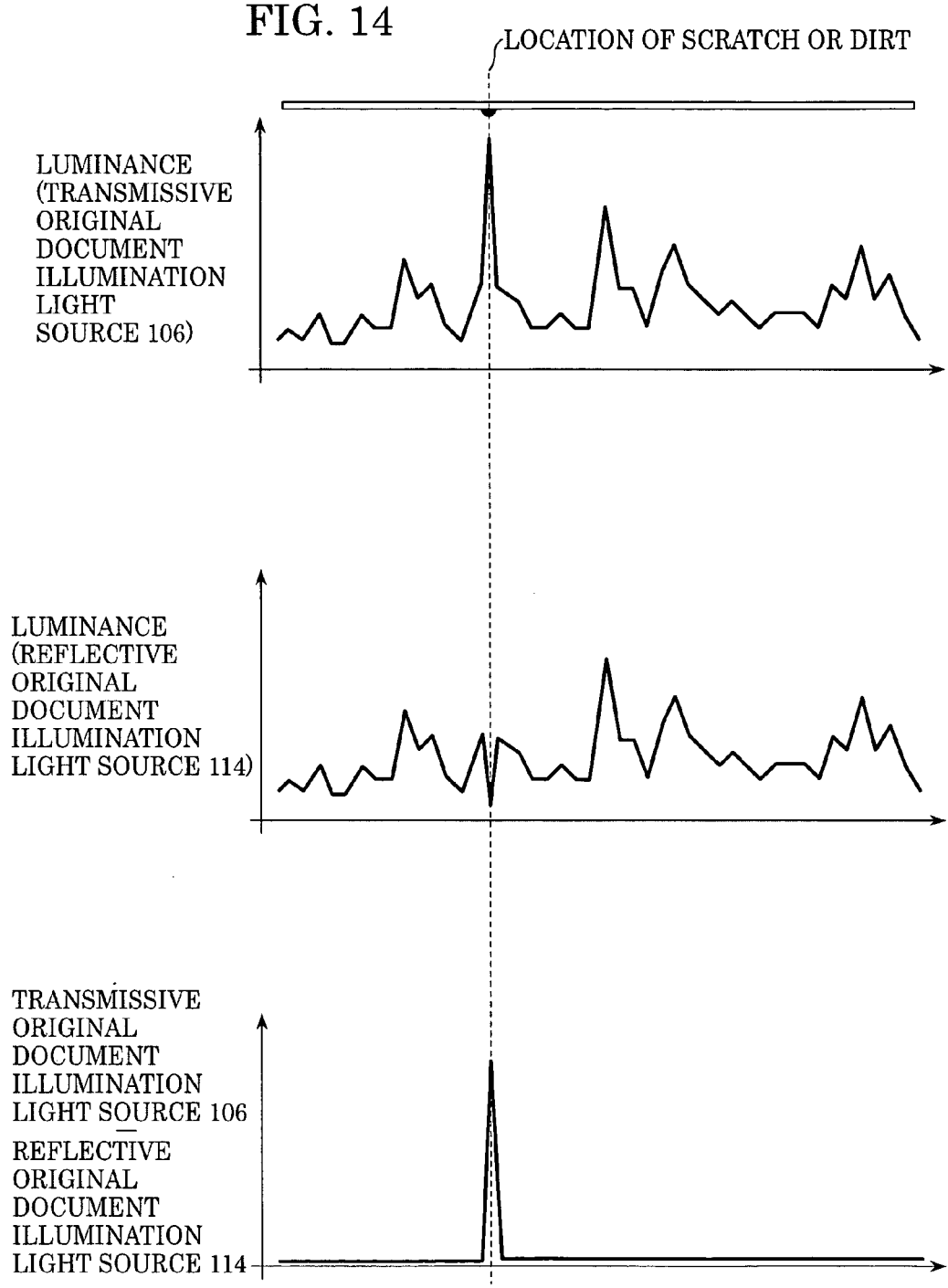

INFORMATION READING APPARATUS, METHOD AND SYSTEM FOR PROCESSING IMAGE, PROGRAM, AND RECORDING MEDIUM

BACKGROUND OF THE INVENTION

1. Field of the Invention

The present invention relates to an image processing technique for reading image information of an original document.

2. Description of the Related Art

A demand for high-resolution color image information is growing along with advances in communication networks, and widespread use of high-speed computers and high capacity storage media. In particular, there is a strong demand for a scanner that reads color image with high precision, high speed and high quality.

There is also a demand for quickly reading an image on a photographic film, such as a sleeve film having a plurality frames, at a high image quality. Japanese Patent Laid-Open No. 2001-298593 (corresponding U.S. Pat. No. 6,660,987) discloses an image reader for removing scratch and dirt on a film to read a high-quality image. According to the disclosure, the image reader includes an infrared light-emitting diode (LED) for detecting scratch and dirt and a planar light source having a light source for reading images. Images are thus read with scratch and dirt information removed therefrom.

The image reader 1 of FIG. 2 disclosed in Japanese Patent Laid-Open No. 2001-298593 reads original document images and photographic film images.

The image reader 1 includes a transmissive original document illumination device 2 for reading a photographic film 20. An image reader control board 3 is electrically connected to the transmissive original document illumination device 2 through a transmissive original document light source inverter 4 and an interface cable 5 to control the transmissive original document illumination device 2. As shown in FIG. 2, the image reader 1 also includes a transmissive original document light source 6 for directing visible light and infrared light to the transmissive original document.

An optical unit 15 focuses an image of an original document on a charge-coupled device (CCD) image sensor 7. The optical unit 15 includes a first reflective mirror 8, a second reflective mirror 9, a third reflective mirror 10, a fourth reflective mirror 11, a fifth reflective mirror 12, a lens 13, a visible-light path length correction glass 21, and a reflective original document illumination light source 14 for illuminating the original document. The optical unit 15 reads the image while being moved in a sub-scan direction as shown by a motor 17. The motor 17 is electrically connected to the image reader control board 3 via a signal cable 16. When placed in a lying position, the visible-light path length correction glass 21 is retraced from the optical path. When placed in an upright position, the visible-light path length correction glass 21 is inserted in the optical path. The CCD image sensor 7 is electrically connected to the image reader control board 3 through a signal cable 18. The motor 17 drives the optical unit 15 in a sub-scan direction. The image reader control board 3 is also connected to an external interface 19. Through the external interface 19, the image reader control board 3 is controlled from the outside. An electrical signal into which the CCD image sensor 7 has photoelectrically converted the optical image of the original document is thus outputted to the outside.

To detect the scratch and dirt information of the film original document 20, the transmissive original document light source 6 emits infrared light. The visible-light path length correction glass 21 is set to an upright position to adjust the optical length so that infrared light is focused on the surface of a film original document sheet. The image reader control board 3 controls the optical unit 15, thereby causing infrared light to scan the film original document. Image data is thus obtained. Film original document sheets typically allow infrared light to transmit therethrough while a scratch and dirt affected area blocks infrared light. By examining luminance on the image data, the scratch and dirt information is obtained.

However, the image reader requires the infrared light source in addition to the transmissive original document illumination light source 6, and further correction means for correcting the optical paths of visible light and infrared light. As such, the structure and control of the image reader become complex.

SUMMARY OF THE INVENTION

The present invention is directed to an image reading apparatus capable of detecting scratch and dirt on a film original document sheet without introducing complex structure and control.

According to a first aspect of the present invention, an image reading apparatus for reading an original document, including a transmissive original document and a reflective original document, includes: an original document placement position having a first side and an opposing second side; a first light source that is arranged on the first side of the original document placement position and operable to illuminate a first light on the transmissive original document; a second light source that is arranged on the opposing second side of the original document placement position and operable to illuminate a second light on one of the reflective original document and the transmissive original document; an image sensor that generates electronic image data, including non-image information based on the first light transmitted through the transmissive original document, and other information based on the second light reflected from the one of the reflective original document and the transmissive original document; a detector unit that detects the non-image information of the image data; and a correction unit that corrects the image data based on the non-image information detected by the detector unit.

The present invention is also directed to an image processing system, including an image reading apparatus for reading an original document, including a transmissive original document and a reflective original document, an image sensor, and an image processing apparatus. The image reading apparatus includes an original document placement position having a first side and an opposing second side, a first light source that is arranged on the first side of the original document placement position and operable to illuminate a first light on the transmissive original document, and a second light source that is arranged on the opposing second side of the original document placement position and operable to illuminate one of the reflective original document and the transmissive original document. The image sensor generates electronic image data, including non-image information based on the first light transmitted through the transmissive original document, and other information based on the second light reflected from the one of the reflective original document and the transmissive original document. The image processing apparatus includes a detector unit that detects the non-image information of the image data, and a correction unit that corrects the image data based on the non-image information detected by the detector unit.

According to a third aspect of the present invention, an image processing method for processing an original document, including a transmissive original document and a reflective original document, in an image processing system having an original document placement position with a first side and an opposing second side, includes: a first illumination step of illuminating a first light on the transmissive original document from the first side of the original document placement position; a second illumination step of illuminating a second light on one of the reflective original document and the transmissive original document from the opposing the second side of the original document placement position; a data acquisition step of generating electronic image data, including non-image information based on the first light transmitted through the transmissive original document in the first illumination step, and other information based on the second light reflected from the one of the reflective original document and the transmissive original document in the second illumination step; a detecting step of detecting the non-image information from the image data that has been generated in the data acquisition step; and a correction step of correcting the image data that has been generated in the data acquisition step, based on the non-image information detected in the detecting step.

In accordance with the present invention, non-image information, such as scratch and dirt information, on the original document is obtained without introducing complex structure and control in the image reading apparatus.

Further features and advantages of the present invention will become apparent from the following description of the embodiments with reference to the attached drawings.

BRIEF DESCRIPTION OF THE DRAWINGS

FIGS. 4A and 4B illustrate a reading operation in which a reflective original document illumination light source is used to read a film original document in accordance with the first embodiment of the present invention.

FIG. 11 is a flowchart of a scratch and dirt removal process in accordance with the first embodiment of the present invention.

FIG. 14 are plots of image data that is obtained when the reflective original document illumination light source and the transmissive original document illumination light source are used in the reading operation in accordance with the second embodiment of the present invention.

DESCRIPTION OF THE EMBODIMENTS

First Embodiment

The embodiments of the present invention are described below with reference to the drawings.

Figure 1:
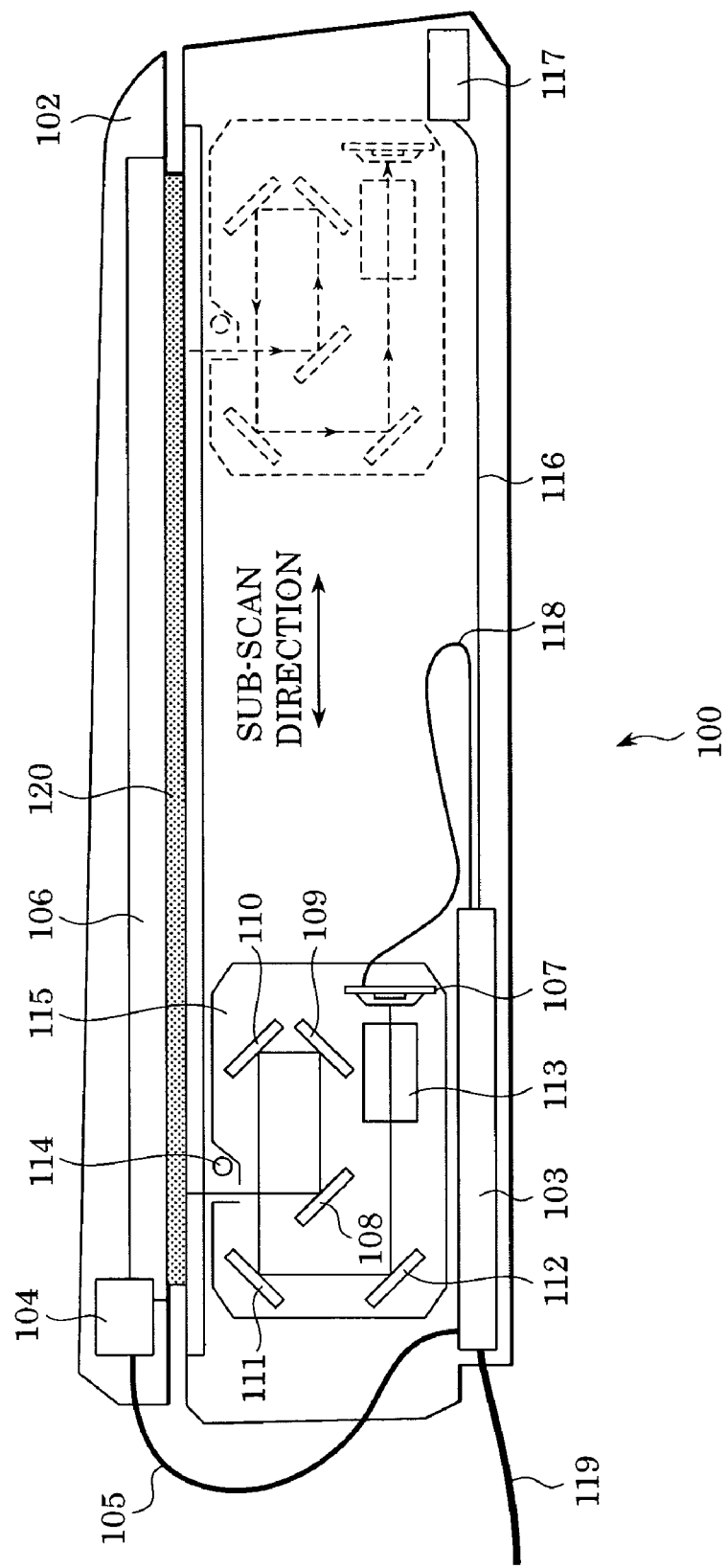
FIG. 1 is a sectional view illustrating the structure of an image reading apparatus in accordance with a first embodiment of the present invention.
Figure 2:
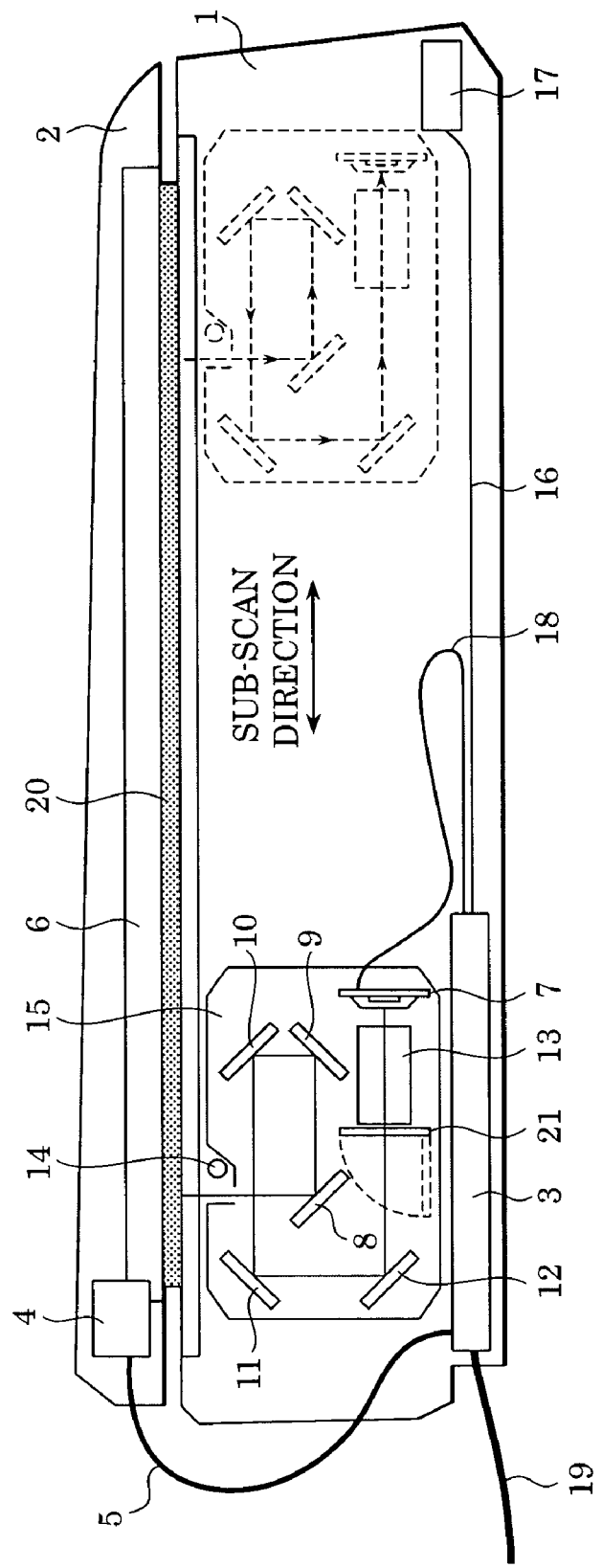
FIG. 2 is a sectional view illustrating a known image reading apparatus.

FIG. 1 illustrates an image reading apparatus 100 of a first embodiment of the present invention.

The image reading apparatus 100 includes a transmissive original document illumination device 102 required for reading a photographic film 120. An image reader control board 103 is electrically connected to the transmissive original document illumination device 102 through a transmissive original document light source inverter 104 and an interface cable 105 to control the transmissive original document illumination device 102. As shown in FIG. 1, the image reading apparatus 100 also includes a transmissive original document light source 106 for directing visible light only to the transmissive original document.

An optical unit 115 focuses an image of an original document on a charge-coupled device (CCD) image sensor 107. The optical unit 115 includes, in a module, a first reflective mirror 108, a second reflective mirror 109, a third reflective mirror 110, a fourth reflective mirror 111, a fifth reflective mirror 112, a lens 113, and a reflective original document illumination light source 114 for illuminating the original document. The optical unit 115 reads the image while being moved in a sub-scan direction (as shown) by a motor 117. The motor 117 is electrically connected to the image reader control board 13 via a signal cable 116.

The CCD image sensor 107 is electrically connected to the image reader control board 103 through a signal cable 118. The motor 117 drives the optical unit 115 in the sub-scan direction. The image reader control board 103 is also connected to an external interface 119. Through the external interface 119, the image reader control board 103 is controlled from the outside. The CCD image sensor 107 photoelectrically converts the optical image of the original document into an electrical signal and outputs the signal to the outside.

Figure 3:
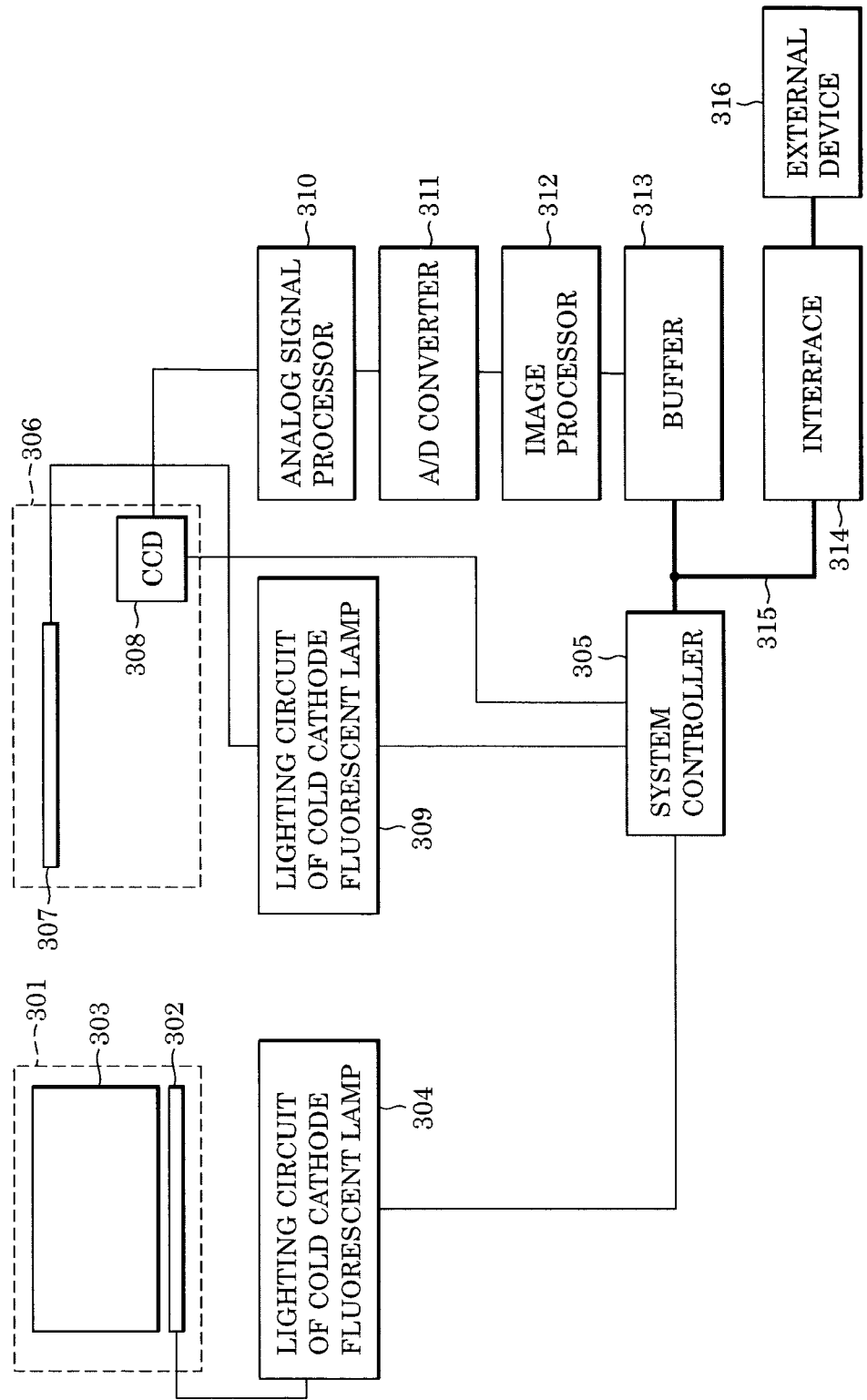
FIG. 3 is a block diagram illustrating the hardware structure of the image reading apparatus in accordance with the first embodiment of the present invention.

FIG. 3 is a block diagram illustrating the hardware structure of the image reading apparatus 100 of the first embodiment of the present invention. A transmissive original document light source 301 for illuminating a film original document includes a cold cathode fluorescent lamp 302 serving as the transmissive original document illumination light source, and a lamp guide 303 for directing light from the light source on the film original document at a right angle with respect thereto. The cold cathode fluorescent lamp 302 is connected to a lighting circuit 304. The lighting circuit 304 is controlled by a system controller 305.

An optical unit 306 includes a cold cathode fluorescent lamp 307 serving as the reflective original document illumination light source, and a CCD image sensor 308. The cold cathode fluorescent lamp 307 is connected to a lighting circuit 309, and the lighting circuit 309 is controlled by the system controller 305. The CCD image sensor 308, controlled by the system controller 305, outputs a signal to an analog signal processor 310. Via the analog signal processor 310, an analog-to-digital (A/D) converter 311, and an image processor 312, the signal from the CCD image sensor 308 is accumulated in a buffer 313. The system controller 305, the buffer 313, and an interface 314, mutually connected by a bus 315, perform data communications with each other. The signal, accumulated in the buffer 313, is then transmitted via the interface 314 to an external device 316 as image data. The external device 316 includes a personal computer, for example.

FIGS. 4A and 4B illustrate a reading operation in which the CCD image sensor 107 reads the image on the film original document with the reflective original document illumination light source 114 switched on.

FIG. 4A illustrates that neither scratch nor dirt is present at a location illuminated by the light source 114 of the optical unit 115. FIG. 4B illustrates that a scratch or dirt is present at a location illuminated by the light source 114 of the optical unit 115.

As shown in FIG. 4A, light emitted from the light source 114 is incident on the film original document 120. Since the film original document 120 has light transmissivity, incident light is simply transmitted through the film original document 120, and is not guided to the CCD image sensor 107.

Figure 5:
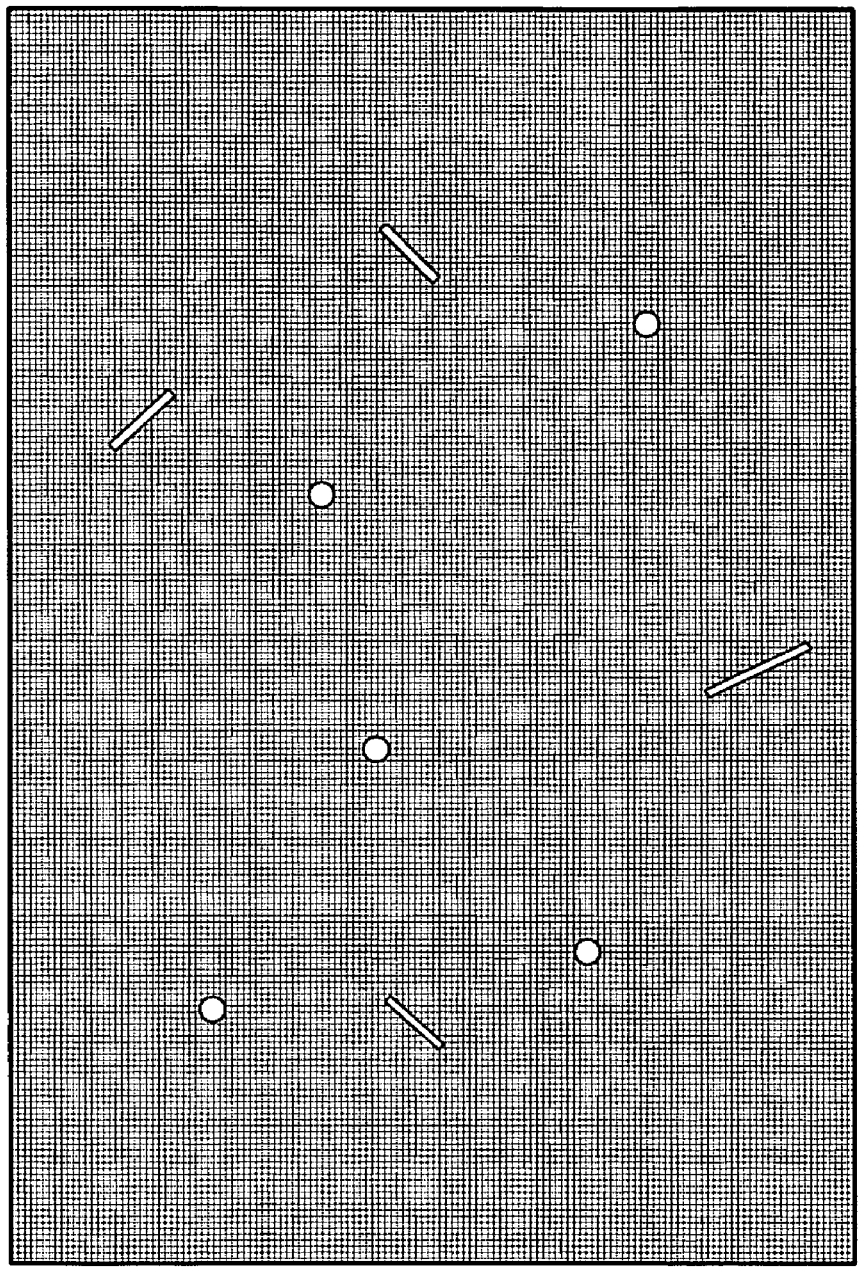
FIG. 5 illustrates image data that is obtained when the film original document is read with the reflective original document illumination light source in accordance with the first embodiment of the present invention.

As shown in FIG. 4B, light emitted from the light source 114 reaches a scratch or dirt 401. A portion of the light reflected from the scratch/dirt 401 is incident on the CCD image sensor 107. The image data that is read from the film original document 120 with the light source 114 turned on is shown in FIG. 5. As shown in FIG. 5, a portion of the light emitted from the light source 114 is reflected from the scratch and dirt on the surface of the film original document 120, and then enters the CCD image sensor 107. Significant pixel values are detected in response to the scratch and dirt while no significant pixel values are detected from the rest of the area of the film original document 120 free from scratch and dirt.

Figure 6A:
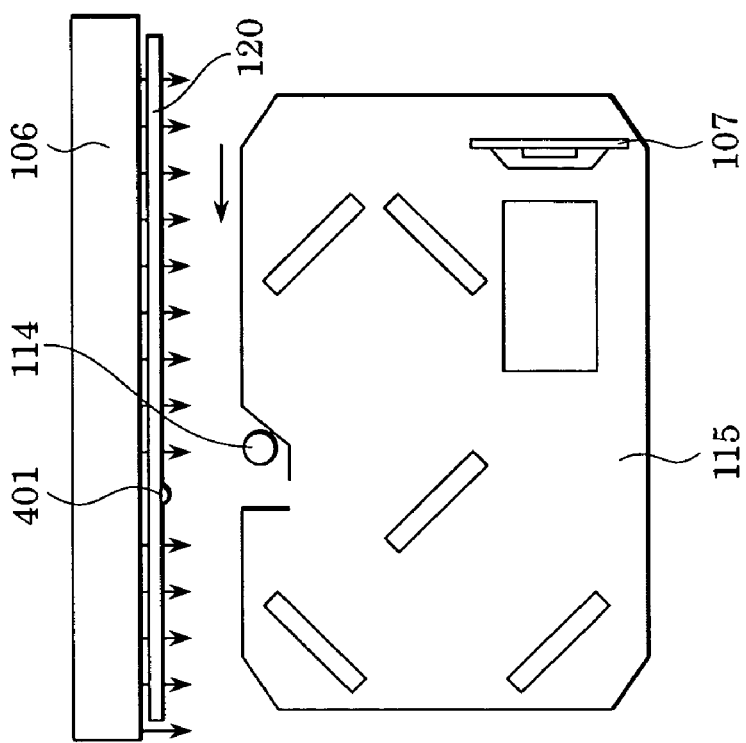
FIGS. 6A and 6B illustrate a reading operation in which a transmissive original document illumination light source is used to read the film original document in accordance with the first embodiment of the present invention.
Figure 6B:
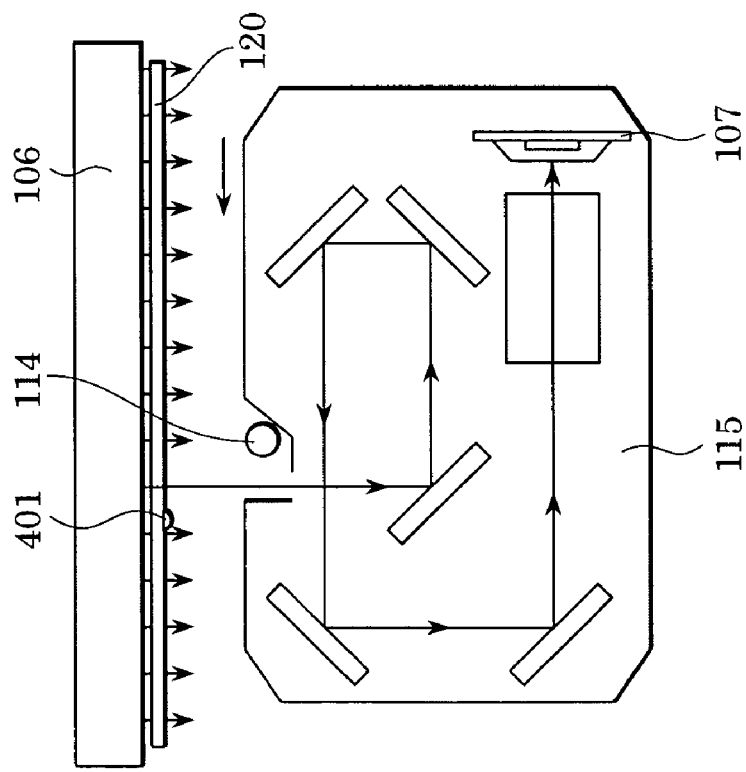

FIGS. 6A and 6B illustrate a reading operation in which the CCD image sensor 107 reads the image on the film original document as image data with transmissive original document illumination light source 106 switched on.

FIG. 6A illustrates that neither scratch nor dirt is present at a location illuminated by the light source 114 of the optical unit 115. FIG. 6B illustrates that a scratch or dirt is present at a location illuminated by the light source 114 of the optical unit 115.

As shown in FIG. 6A, light emitted from the transmissive original document illumination light source 106 is incident on the film original document 120. Since the film original document 120 has light transmissivity, incident light is simply transmitted through the film original document 120, and is guided to and enters the CCD image sensor 107.

As shown in FIG. 6B, a portion of light emitted from the transmissive original document illumination light source 106 is blocked by the scratch/dirt 401 on the film original document 120 and cannot reach the CCD image sensor 107.

Figure 7:
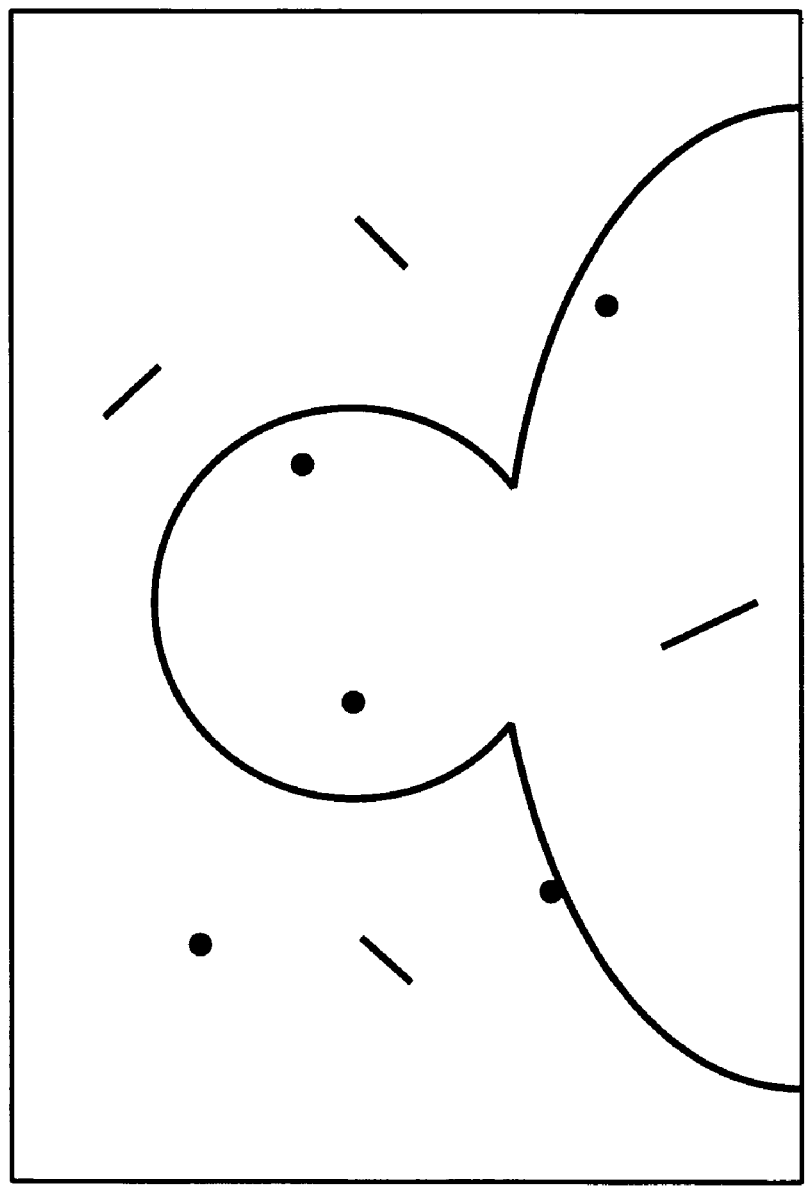
FIG. 7 illustrates image data that is obtained when the reflective original document illumination light source is used to read the film original document in accordance with the first embodiment of the present invention.

FIG. 7 illustrates image data that is obtained from the film original document 120 with the transmissive original document illumination light source 106 switched on. As shown in FIG. 7, a portion of light emitted from the transmissive original document illumination light source 106 incident on the scratch and dirt on the surface of the film original document 120 is blocked by the scratch and dirt, and cannot reach the CCD image sensor 107. An area of the film original document 120 free from the scratch and dirt is detected as significant values. The image data thus contains scratch and dirt.

Figure 8:
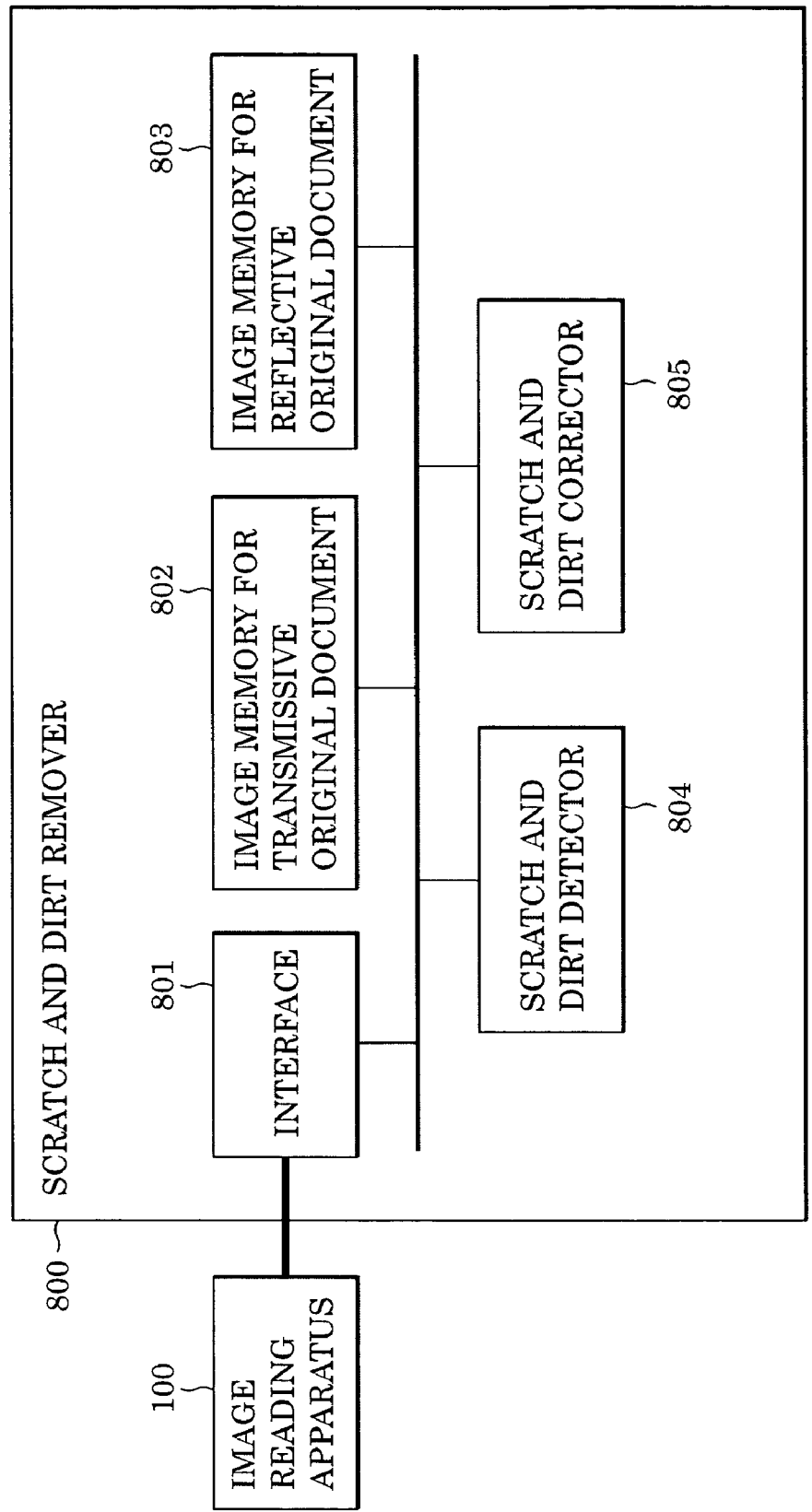
FIG. 8 illustrates the structure of a scratch and dirt remover in accordance with the first embodiment of the present invention.

FIG. 8 is a block diagram illustrating a scratch and dirt remover 800 that performs a scratch and dirt correction operation on the image outputted from the image reading apparatus 100. The scratch and dirt remover 800 includes a computer arranged as the external device 316 of FIG. 3. Alternatively, the scratch and dirt remover 800 may be arranged within the image reading apparatus 100.

A scratch and dirt removal process of the first embodiment is described below with reference to the block diagram of FIG. 8 and a flowchart of FIG. 11. FIG. 11 is the flowchart of the process for removing scratch and dirt information from the image data in accordance with the first embodiment of the present invention.

In step S1101, the image data read with the reflective original document illumination light source 114 turned on is transferred from the image reading apparatus 100 to an image memory 803 for a reflective original document through an interface 801 for storage.

In step S1102, the image data read with the transmissive original document illumination light source 106 turned on is transferred from the image reading apparatus 100 to an image memory 802 for a transmissive original document through the interface 801.

In step S1103, a scratch and dirt detector 804 detects the scratch and dirt information from the image data stored in the image memory 803, and transmits the detected scratch and dirt information to a scratch and dirt corrector 805. In step S1104, the scratch and dirt corrector 805 corrects the image data stored in the image memory 802 using the received scratch and dirt information.

The image data of FIG. 5 stored in the image memory 803 contains luminance value of the light reflected from the scratch and dirt area. The scratch and dirt detector 804 thus detects the scratch and dirt information based on luminance information. More specifically, each pixel value forming the image data is compared with a predetermined threshold, and a pixel value above the threshold is detected as being a pixel representing the scratch and dirt. If the position of the detected pixel in the image data is stored, the position of the scratch and dirt is easily determined.

Using the detected scratch and dirt information, the scratch and dirt corrector 805 identifies the location and size of the scratch and dirt in the image data containing the scratch and dirt information as shown in FIG. 7. Image data free from the scratch and dirt is generated by interpolating the data of the scratch and dirt with image data of the remaining area. The interpolation technique can be any known one and is not discussed here.

Figure 9:
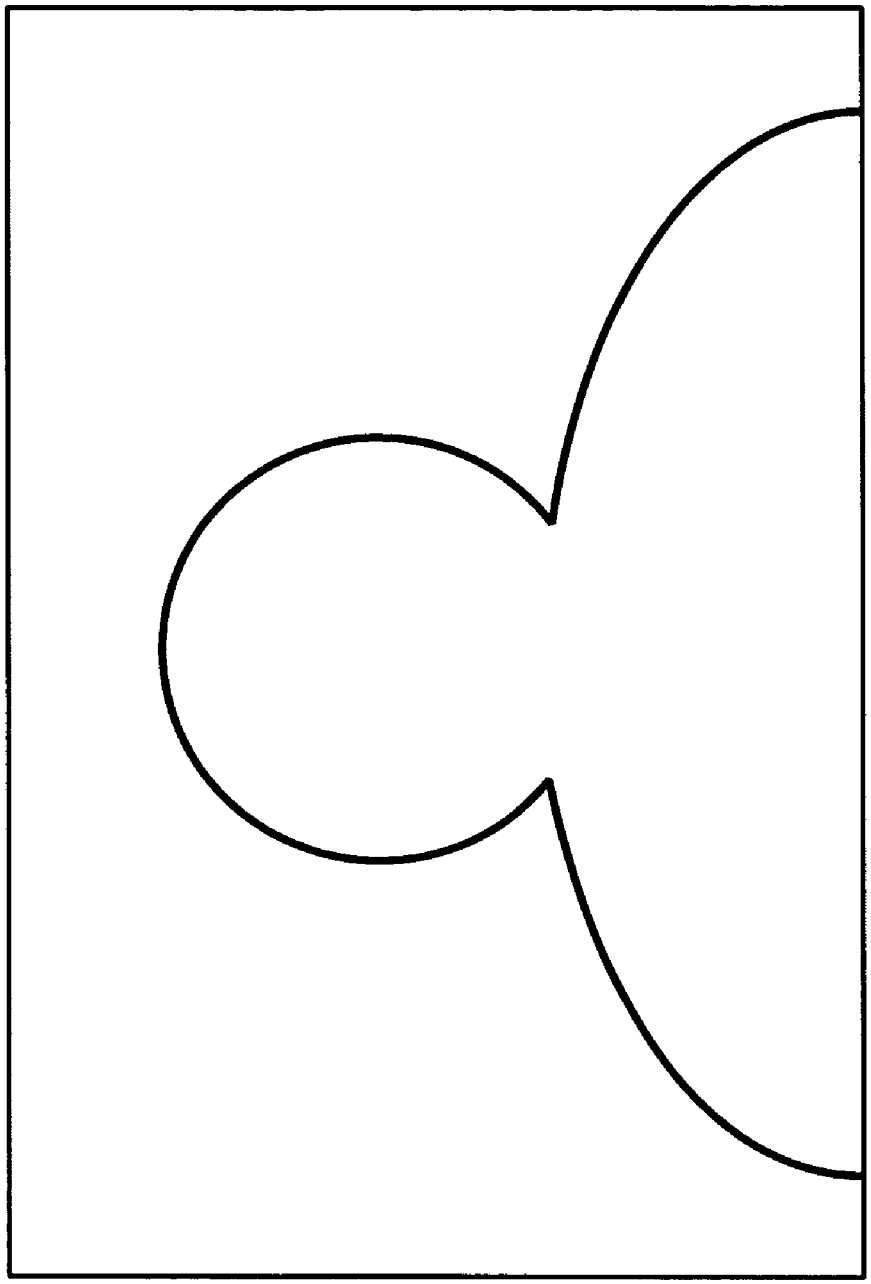
FIG. 9 illustrates image data that is obtained when scratch and dirt are removed from image data that is read from the film original document using the transmissive original document illumination light source in accordance with the first embodiment of the present invention.

FIG. 9 illustrates an example of the image data resulting from the scratch and dirt removal process. As shown in FIG. 9, in the scratch and dirt removal process, the information of the scratch and dirt present at the locations of FIG. 5 is removed from the image data of FIG. 7, so that the image data free from the scratch and dirt results.

Figure 10:
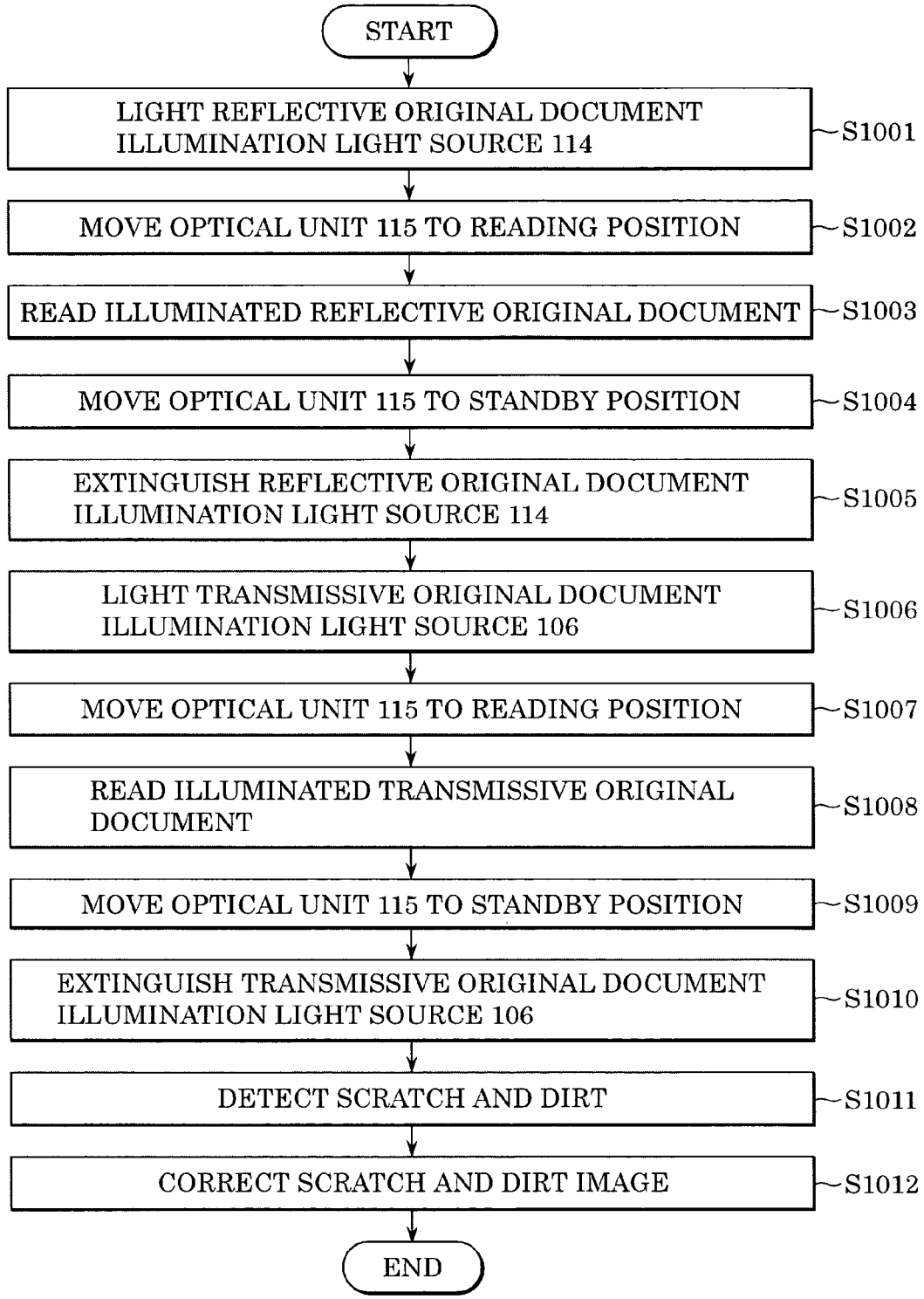
FIG. 10 is a flowchart of a process of the image reading apparatus in accordance with the first embodiment of the present invention.

The scratch and dirt removal process of the first embodiment is described with reference to a flowchart of FIG. 10.

The scratch and dirt removal process is performed by the external device 316 and the system controller 305.

In step S1001, the light source 114 for the reflective original document is switched on. Since some sort of cold cathode fluorescent lamps take some time to reach a full level of luminance, sufficient time must be permitted.

In step S1002, the optical unit 115 is moved to a reading start position where the film original document 120 is set.

In step S1003, the system controller 305 causes the optical unit 115 to read the image on the film original document 120 with the reflective original document illumination light source 114. In step S1004, the optical unit 115 is shifted back to a predetermined standby position. In step S1005, the reflective original document illumination light source 114 is extinguished. In step S1006, the transmissive original document illumination light source 106 is switched on. Since some cold cathode fluorescent lamps take some time to reach a full level of luminance, sufficient time must be permitted.

In step S1007, the optical unit 115 is moved to a reading start position where the film original document is placed. In step S1008, the system controller 305 causes the optical unit 115 to read the image on the film original document with the transmissive original document illumination light source 106. In step S1009, the optical unit 115 is moved back to a predetermined standby position. In step S1010, the transmissive original document illumination light source 106 is extinguished. In step S1011, the scratch and dirt information is detected from the image data read by the scratch and dirt remover 800. In step S1012, the scratch and dirt remover 800 corrects the image data based on the scratch and dirt information acquired in step S1011.

In the above sequence, the reflective original document illumination light source 114 is used first, followed by the transmissive original document illumination light source 106. This sequence is not important. The transmissive original document illumination light source 106 may be used first to perform the ordinal image reading process, and then, the reflective original document illumination light source 114 may be used to illuminate the film original document to obtain the scratch and dirt information of the image data.

As described above, the reflective original document illumination light source 114 detects scratch and dirt on the film original document, and the scratch and dirt remover 800 interpolates the image data, thereby resulting in an image free from scratch and dirt.

Second Embodiment

When the reflective original document illumination light source 114 illuminates the film original document 120 in the image reading apparatus 100, light transmitted through the film original document 120 can be diffusively reflected from the transmissive original document illumination light source 106. The diffusively reflected light can enter the CCD image sensor 107, presenting difficulty to the scratch and dirt remover 800 in the detection and removal operation thereof.

In accordance with a second embodiment of the present invention, the scratch and dirt information is detected and then removed even when diffusive reflection takes place. The structure of the image reading apparatus 100 of the second embodiment is identical to the first embodiment, and the discussion thereof is omitted herein.

Figure 12A:
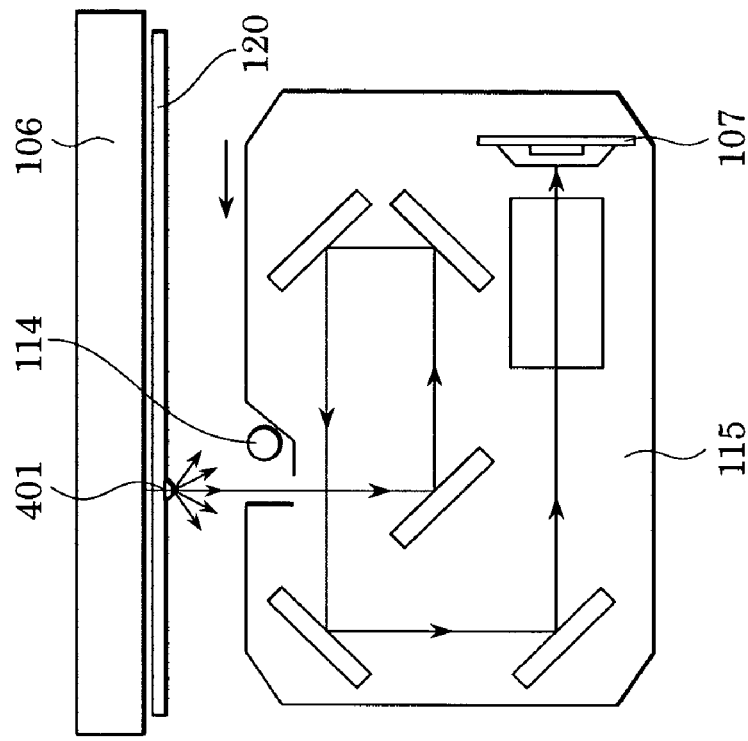
FIGS. 12A and 12B illustrate a reading operation in which the reflective original document illumination light source is used to read the film original document in accordance with a second embodiment of the present invention.
Figure 12B:
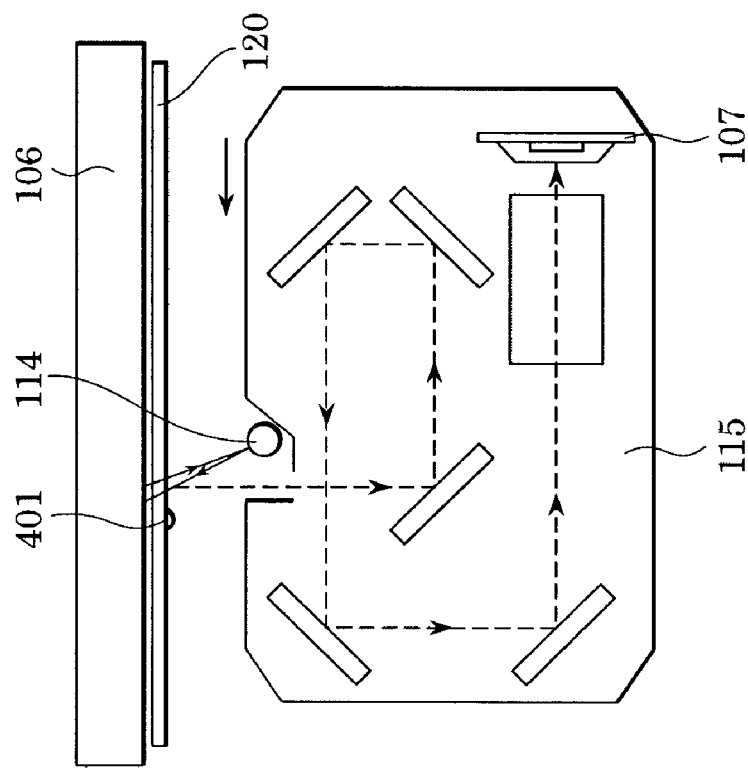

FIGS. 12A and 12B illustrate a reading operation in which the CCD image sensor 107 reads an image on a film original document to acquire image data with the reflective original document illumination light source 114 lighted.

FIG. 12A shows that neither scratch nor dirt is present at a location illuminated by the light source 114 of the optical unit 115. FIG. 4B shows that a scratch or dirt is present at a location illuminated by the light source 114 of the optical unit 115.

As shown in FIG. 12A, light emitted from the light source 114 is incident on the film original document 120. Since the film original document 120 has light transmissivity, incident light is simply transmitted through the film original document 120, and is not guided to the CCD image sensor 107. A portion of the light emitted from the reflective original document illumination light source 114 is transmitted through and can then diffusively reflect from the transmissive original document illumination light source 106. The diffusively reflected light is again transmitted through the film original document 120 and enters the CCD image sensor 107. As shown in FIG. 12B, light emitted from the light source 114 reaches the scratch and dirt 401, and is diffusively reflected from the scratch and dirt 401. A portion of the diffusively reflected light enters the CCD image sensor 107.

Figure 13:
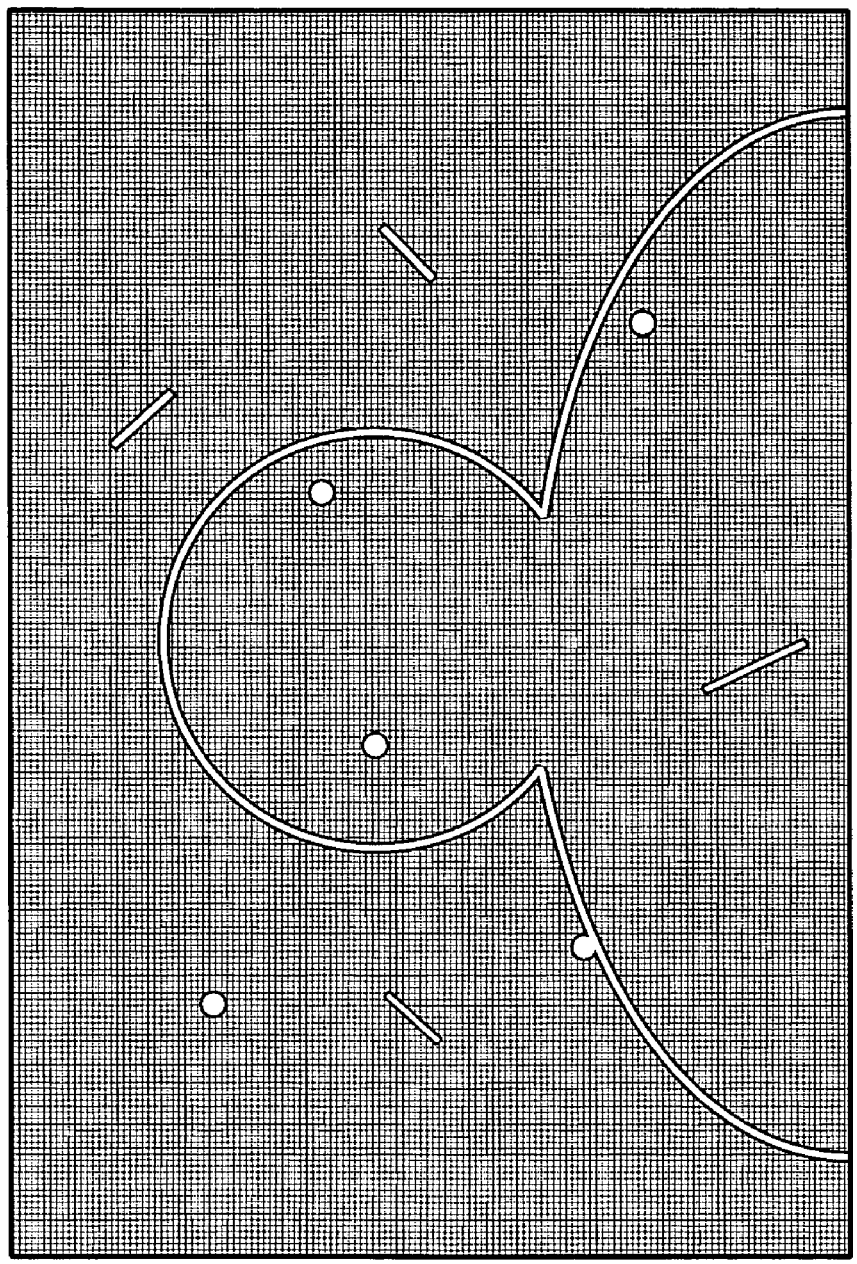
FIG. 13 illustrates image data that is obtained when the film original document is read with the reflective original document illumination light source in accordance with the second embodiment of the present invention.

The image data that is read from the film original document 120 with the light source 114 turned on is shown in FIG. 13. The image data contains not only the scratch and dirt information but also the image information of the film original document 120 acquired by the CCD image sensor 107 resulting from diffusive reflection.

As in the first embodiment, the reading operation of FIGS. 6A and 6B is performed to read the image information of the film original document 120 with the transmissive original document illumination light source 106 turned on. FIG. 7 illustrates the image data acquired by the CCD image sensor 107.

These two pieces of image data thus obtained are stored in the image memory 802 for the transmissive original document and the image memory 803 for the reflective original document.

Referring to FIG. 14, the scratch and dirt information removable process of the second embodiment is described below. FIG. 14 illustrates the scratch and dirt information removable process of the second embodiment.

A top graph of FIG. 14 illustrates pixel values in one line of the image data stored in the reflective original document image memory 803. A middle graph of FIG. 14 illustrates pixel values in one line of the image data stored in the transmissive original document image memory 802. In comparison of the two graphs, the two pieces of data show substantially the same data distribution in a film area where neither scratch nor dirt is present. In the area of scratch and dirt, the pixel values of the two pieces of image data shift in mutually reverse directions. If a difference between the two pieces of image data is calculated, a bottom graph of FIG. 14 results. Based on the difference, the location and size of the scratch and dirt are detected on a per line basis.

FIG. 14 shows one example only. The magnitudes of pixel values acquired in the scratch and dirt free area of the film original document 120 do not always match each other between the two pieces of image data. However, the top graph and the middle graph are distinctly different in the pixel values in the scratch and dirt affected area. Since the pixel value difference in the scratch and dirt affected area is substantially larger than the pixel value difference in the scratch and dirt free areas, the scratch and dirt affected area is easily discriminated from the rest of the film original document 120.

Even if diffusive reflection takes place on the transmissive original document illumination light source 106 with the film original document 120 illuminated by the reflective original document illumination light source 114, the scratch and dirt information is removed. A scratch and dirt free image of the film original document 120 is thus obtained using the difference between the image data obtained with the reflective original document illumination light source 114 and the image data obtained with the transmissive original document illumination light source 106.

ALTERNATE EMBODIMENT

A storage medium storing program codes of the software program performing the functions of the embodiments of the present invention is installed in a system or an apparatus, and a computer (including a CPU) of the system or the apparatus reads and executes the program codes stored in the storage medium. Such embodiments achieve the object of the present invention. The program codes read from the storage medium perform the functions of the foregoing embodiments of the present invention, and storage medium storing the program codes falls within the scope of the present invention. By executing the program codes read by the computer, the functions of the foregoing embodiments are performed. Furthermore, the operating system (OS) running on the computer performs partly or entirely a process in response to the instruction of the program code, and with the process performed, the functions of the above-referenced embodiments are performed. Such program codes fall within the scope of the present invention. The program codes read from the storage medium are read into a memory incorporated in a hardware unit in the computer. The CPU mounted on the hardware unit performs partly or entirely the actual process in response to instructions from the program codes. The functions of the above embodiments are executed through the process. Such program codes fall within the scope of the present invention.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-435448 filed Dec. 26, 2003, which is hereby incorporated by reference herein.

What is claimed is:

1. An image reading apparatus for reading an original document, including a transmissive original document and a reflective original document, the image reading apparatus comprising:
   an original document placement position having a first side and an opposing second side;
   a first light source arranged on the first side of the original document placement position and operable to illuminate a first light on the transmissive original document;
   a second light source arranged on the opposing second side of the original document placement position and operable to illuminate a second light on one of the reflective original document and the transmissive original document;
   an image sensor generating electronic image data, including non-image information based on the first light transmitted through the transmissive original document, and other information based on the second light reflected from the one of the reflective original document and the transmissive original document;
   a detector unit configured to detect the non-image information of the electronic image data; and
   a correction unit correcting the electronic image data based on the non-image information detected by the detector unit.

2. The image reading apparatus according to claim 1, wherein the non-image information includes information corresponding to a location and a size of at least one of a scratch and dirt on the transmissive original document.

3. The image reading apparatus according to claim 1, wherein the detector unit detects the non-image information based on detecting a difference between data corresponding to the first light reflected from the transmissive original document and data corresponding to the first light transmitted through the transmissive original document.

4. The image reading apparatus according to claim 2, wherein the detector unit detects the non-image information based on detecting a difference between data corresponding to the first light reflected from the transmissive original document and data corresponding to the first light transmitted through the transmissive original document.

5. The image reading apparatus according to claim 1, wherein the transmissive original document includes a film original document sheet, and wherein the reflective original document includes a paper original document sheet.

6. The image reading apparatus according to claim 2, wherein the transmissive original document includes a film original document sheet, and wherein the reflective original document includes a paper original document sheet.

7. An image processing system, comprising:
   an image reading apparatus operable to read an original document, including a transmissive original document and a reflective original document, wherein the image reading apparatus includes:
      an original document placement position having a first side and an opposing second side;
      a first light source arranged on the first side of the original document placement position and operable to illuminate a first light on the transmissive original document; and
      a second light source arranged on the opposing second side of the original document placement position and operable to illuminate one of the reflective original document and the transmissive original document;
   an image sensor generating electronic image data, including non-image information based on the first light transmitted through the transmissive original document, and other information based on the second light reflected from the one of the reflective original document and the transmissive original document; and
   an image processing apparatus including:
      a detector unit configured to detect the non-image information of the electronic image data; and
      a correction unit correcting the electronic image data based on the non-image information detected by the detector unit.

8. The image processing system according to claim 7, wherein the non-image information includes information corresponding to a location and a size of at least one of a scratch and dirt on the transmissive original document.

9. The image processing system according to claim 7, wherein the detector unit detects the non-image information based on detecting a difference between data corresponding to the first light reflected from the transmissive original document and data corresponding to the first light transmitted through the transmissive original document.

10. The image processing system according to claim 8, wherein the detector unit detects the non-image information based on detecting a difference between data corresponding to the first light reflected from the transmissive original document and data corresponding to the first light transmitted through the transmissive original document.

11. The image processing system according to claim 7, wherein the transmissive original document includes a film original document sheet, and wherein the reflective original document includes a paper original document sheet.

12. The image processing system according to claim 8, wherein the transmissive original document includes a film original document sheet, and wherein the reflective original document includes a paper original document sheet.

13. An image processing method for processing an original document, including a transmissive original document and a reflective original document, in an image processing system having an original document placement position with a first side and an opposing second side, comprising the following steps:

a first illumination step of illuminating a first light on the transmissive original document from the first side of the original document placement position;

a second illumination step of illuminating a second light on one of the reflective original document and the transmissive original document from the opposing second side of the original document placement position;

a data acquisition step of generating electronic image data, including non-image information based on the first light transmitted through the transmissive original document in the first illumination step, and other information based on the second light reflected from the one of the reflective original document and the transmissive original document in the second illumination step;

a detecting step of detecting the non-image information from the electronic image data generated in the data acquisition step; and a correction step of correcting the electronic image data generated in the data acquisition step, based on the non-image information detected in the detecting step.

14. The image processing method according to claim 13, wherein the data acquisition step includes generating the non-image information to include a location and a size of at least one of a scratch and dirt on the transmissive original document.

15. The image processing method according to claim 13, wherein the detecting step comprises detecting a difference between data corresponding to the first light reflected from the transmissive original document and data corresponding to the first light transmitted through the transmissive original document.

16. The image processing method according to claim 14, wherein the detecting step comprises detecting a difference between data corresponding to the first light reflected from the transmissive original document and data corresponding to the first light transmitted through the transmissive original document.

17. The image processing method according to claim 13, wherein the transmissive original document includes a film original document sheet, and wherein the reflective original document includes a paper original document sheet.

18. The image processing method according to claim 14, wherein the transmissive original document includes a film original document sheet, and wherein the reflective original document includes a paper original document sheet.

19. A computer readable recording medium storing a computer program for causing a computer to perform the steps of the image processing method according to claim 13.

* * * * *